United States Patent [19]
Ahne

[11] 3,814,188
[45] June 4, 1974

[54] ELECTRONIC DRAFT LOAD SENSING SYSTEM

[75] Inventor: Jerome J. Ahne, Elm Grove, Wis.

[73] Assignee: Allis-Chalmers Corporation, Milwaukee, Wis.

[22] Filed: Oct. 2, 1972

[21] Appl. No.: 294,313

[52] U.S. Cl. .................................................. 172/7
[51] Int. Cl. ........................................... A01b 63/112
[58] Field of Search ................ 172/7, 9, 2, 3, 8, 10; 73/141 A, 144

[56] References Cited
UNITED STATES PATENTS

| | | |
|---|---|---|
| 2,946,392 | 7/1960 | Nelson .................................. 172/7 |
| 3,241,620 | 3/1966 | Brudnak, Jr. ........................... 172/7 |
| 3,246,701 | 4/1966 | Schulz .................................... 172/9 |
| 3,374,842 | 3/1968 | Smith, Jr. ............................... 172/7 |
| 3,554,025 | 1/1972 | Anderson et al. ...................... 73/144 |
| 3,707,076 | 12/1972 | Jones .................................. 73/141 A |

*Primary Examiner*—Stephen C. Pellegrino
*Attorney, Agent, or Firm*—Arthur L. Nelson

[57] ABSTRACT

An electronic draft load sensing unit for a tractor having strain gauge sensing responsive to draft load on said tractor.

8 Claims, 6 Drawing Figures

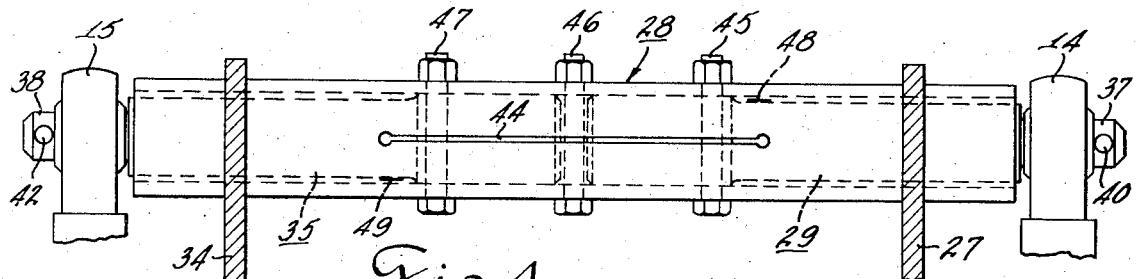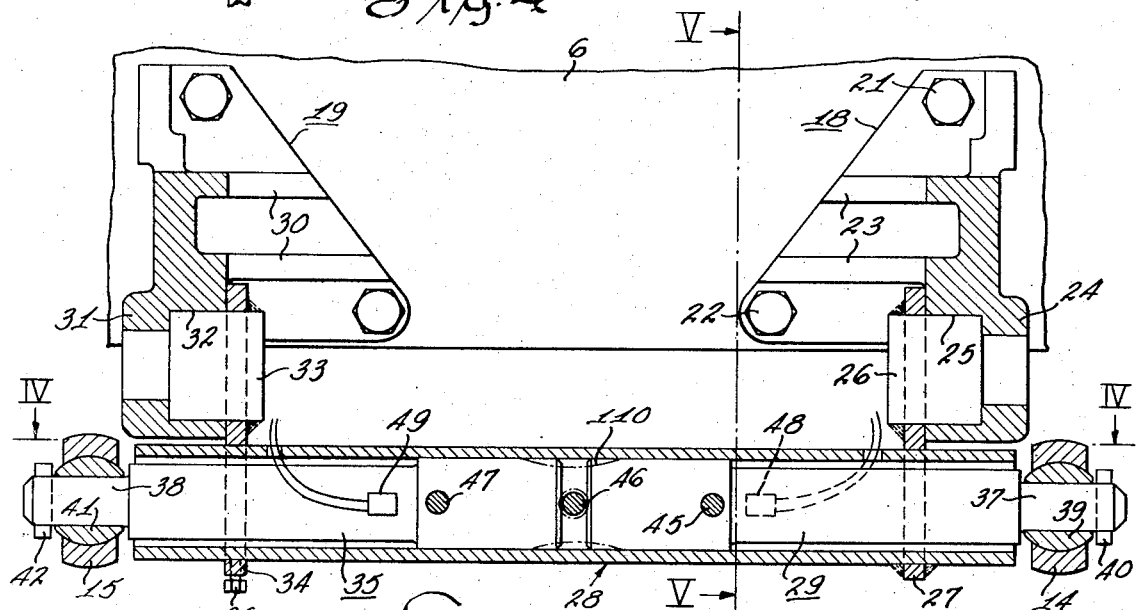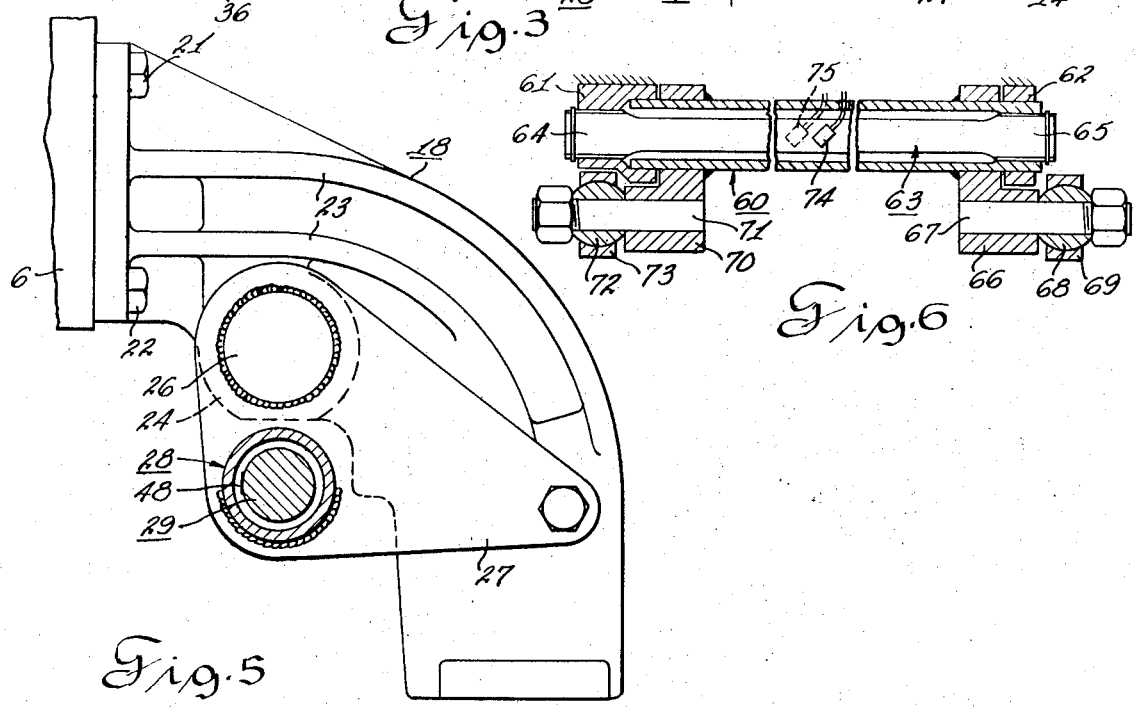

ELECTRONIC DRAFT LOAD SENSING SYSTEM

This invention relates to a draft load sensing unit and more particularly to an electronic draft load sensing unit using a strain gauge on a crossbar to sense draft loads.

Draft load sensing systems on tractors have been used for a number of years. These systems, although originally not incorporated with a three-point hitch, have been in more recent years used in combination with a three-point hitch. The three-point hitch provides either lower draft arm load sensing or upper link sensing. The more common system used today is sensing the draft load applied to the lower draft arms in pulling a semi-mounted implement. There are certain inherent disadvantages with the strictly mechanical sensing system, although its ruggedness and durability have promoted its continued use for a number of years. Because of an increased demand in space for auxiliary equipment on the tractor and the inherent disadvantages in a strictly mechanical system such as hysteresis, inaccuracies caused by bearing friction, and response through the linkages used in combination with this type of a system to operate the hydraulic valves in the weight distribution system, an electronic system becomes more attractive. With the improved economy and availability of electronic components and with the improved reliability of electronic systems over the last 20 years, their use is more feasible. The extensive use of strain gauges and their improved reliability in the aircraft industry and other fields have contributed to making their use more practical. Accordingly, this invention takes advantage of the advances in the art to provide strain gauge sensing with electronic amplifying and control system to operate the hydraulic valve in the weight distribution system. This system can be used with the basic hydraulic system for weight distribution of the vehicle in response to draft load sensing.

It is an object of this invention to provide electronic draft load sensing using a strain gauge, with electronic amplification and control for the hydraulic weight distribution system of a tractor.

It is another object of this invention to provide draft load sensing having a strain gauge on a crossbar stressed in bending to initiate a signal amplified in an electronic control circuit for operating the hydraulic weight distribution system.

It is a further object of this invention to provide draft load sensing in combination with a three-point hitch having draft arms pivotally connected to a crossbar to sense draft load through a strain gauge on the crossbar.

It is a further object of this invention to provide draft load sensing with a strain gauge on a torsion bar in combination with a three-point hitch operating the hydraulic weight distribution system on a vehicle.

The objects of this invention are accomplished by supporting a crossbar on a hanger bracket mounted on the rear end of the vehicle. The crossbar is encased in a sleeve having clearances to allow for bending or torsional movement of the crossbar within the sleeve. The deflection of the crossbar is produced by a draft load on the lower draft arm which are connected to the extreme ends of the crossbar. Two strain gauges are mounted on the crossbar to sense the stress applied to the crossbar which in turn initiates a signal which is amplified and then applied to an electrically operated hydraulic valve to control the raising and lowering of the lower draft arms through a weight distribution system. The hydraulic control system redistributes the weight of the tractor and lifts the implement as the draft load is increased and lowers the implement as the draft load is decreased in response to the draft load sensing. Any increase in weight on the rear wheels accommodates an increase in draft load up to a predetermined point while a decrease in weight on the rear wheels decreases the draft load the tractor can pull.

Referring to the drawings:

FIG. 3 is a rear cross section view taken in a vertical plane of the crossbar and its support brackets to show the position of the strain gauges;

FIG. 4 is a plan view of the crossbar and its suspension within a sleeve and the forward portions of the lower draft arms taken along line IV—IV of FIG. 3;

FIG. 5 is a side view in partial section of the hanger brackets and the support for the sleeve encasing a crossbar of the draft sensing unit taken along line V—V of FIG. 3;

FIG. 6 is a fragmentary cross section view taken in a vertical plane showing a torsion bar carrying the strain gauges to provide the draft load sensing means.

Figure 1:
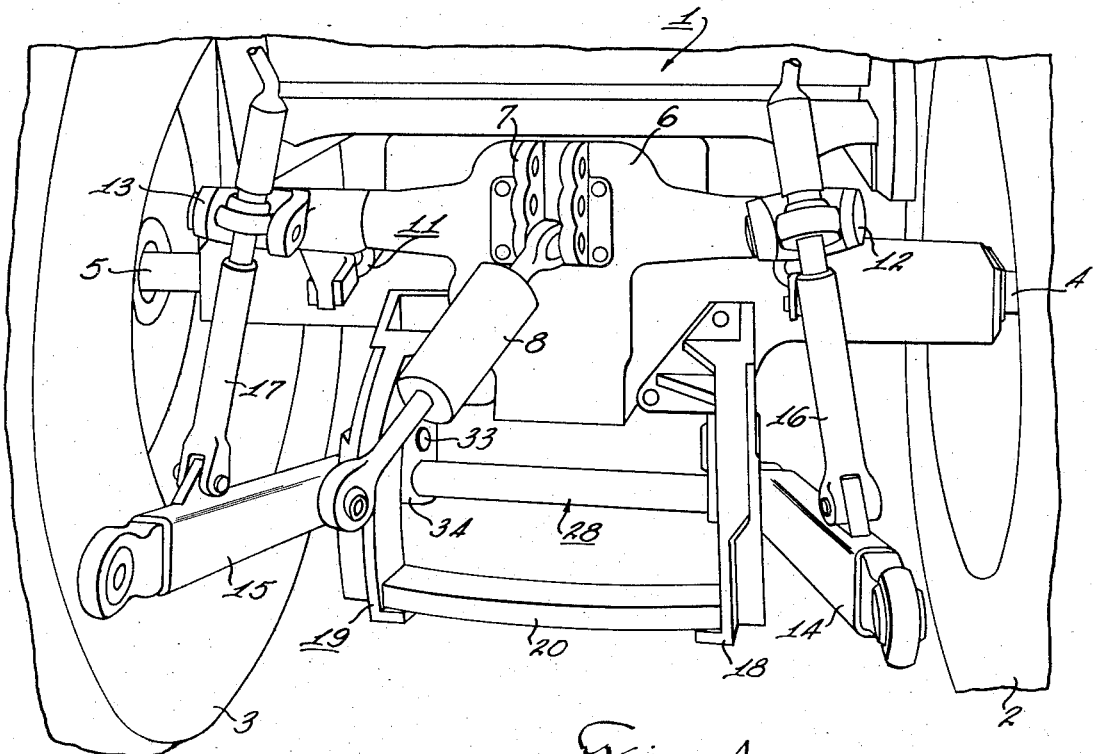
FIG. 1 illustrates a three-dimensional view of the three-point hitch and the suspension of the crossbar on the tractor.
Figure 2:
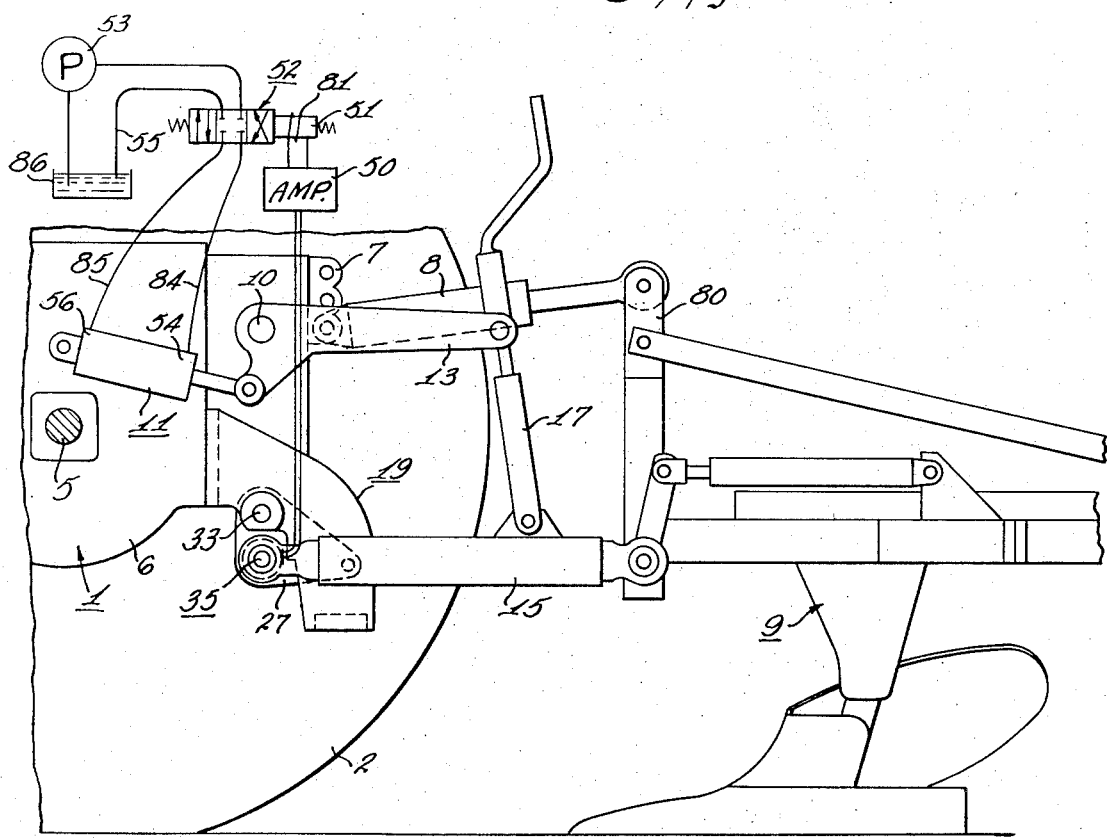
FIG. 2 illustrates a side elevation view of the rear end of the tractor and a portion of the implement and the suspension of the crossbar on the three-point hitch showing the relative relationship of the mechanical components of the weight distribution system.

Referring to FIG. 1, the rear end of the tractor 1 is shown supported by the rear wheels 2 and 3. The rear axles 4 and 5 drive the rear wheels and extend into the rear drive housing 6. The bracket 7 supports the upper link 8 which is adapted for connection to an implement 9 as shown in FIG. 2. A rock shaft 10 is pivotally supported in the rear drive housing 6 and is pivoted in response to actuation of the hydraulic cylinders of which cylinder 11 is shown.

The rock shaft is connected to the rock arms 12 and 13. The rock shaft 10 and rock arms 12 and 13 raise and lower the draft arms 14 and 15 through the lift links 16 and 17. The raising and lowering of the draft arms 14 and 15 in turn raises and lowers the implement 9 which for the purpose of illustration is a plow. A rear drive housing 6 supports the hanger brackets 18 and 19 which are connected by the U-bar 20. This assembly is adapted for supporting a swinging drawbar (not shown). The brackets 18 and 19 are shown more clearly in FIGS. 3 and 5. Hanger bracket 18 is fastened by means of bolts 21 and 22. Reinforcing ribs 23 provides rigidity for the depending portion 24. The depending portion 24 defines a cylindrical opening 25 which receives a stubshaft 26 fabricated to a plate 27. The plate 27 supports the sleeve 28 which carries the right-hand crossbar 29.

The bracket 19 similarly is reinforced with the ribs 30 for supporting the depending portion 31 which defines an annular recess 32. The subshaft 33 is received in the annular recess 32 and is fabricated to the plate 34. The plate 34 is connected to the left-hand end of the sleeve 28 which supports the left-hand crossbar 35. For simplicity of assembly the right-hand plate 27 is welded to the sleeve 28 while the plate 34 carries the left-hand end of the sleeve 28 and is locked in position by the set screw 36.

The crossbars 29 and 35 although shown as two identical components might be installed as a single component continuous from one end of the sleeve 28 to the other as shown by the phantom lines 110 in FIG. 3 to provide pivotal support for the lower draft arms on the reduced diameter end portions 37 and 38. A spherical bushing 39 supports the lower draft arm 14 while the pin 40 retains the bushing 39 and draft arm 14 in its normal supported position.

The reduced diameter 38 of shaft 35 supports the spherical bushing 41 which in turn carries the draft arm 15 which is retained in position by the pin 42 in its normally supported position as shown.

FIG. 4 shows the sleeve 28 having a slit 44 to permit expansion and contraction of the sleeve in the intermediate portion for reception of the crossbar 29 and 35. Once the crossbars are in position, the bolts 45, 46, and 47 and their mating nuts firmly lock the bars in position and maintain them in a nonrotated position as the sleeve is contracted onto their external surfaces. With the crossbars 29 and 35 supported in this position the strain gauges 48 and 49 are positioned on each of the bars as shown and are enclosed in sleeves to protect them from damage in their operating position. It is noted that bar 29 is installed so that the strain gauge 48 is positioned on the front side of the bar 29 and the bar 35 is installed so that strain guage 49 is positioned on the rear side of the bar 35. With the strain gauges positioned in this relative position the one strain gauge 48 is in tension as a draft load is applied through the crossbar 29 while the strain gauge 49 is in compression on crossbar 35. By positioning the strain gauges in this relative position, the voltage across one strain gauge increases while the voltage across the other decreases which increased the voltage signal in the circuit. Reference may be had to a copending application of the same assignees, Electronic Upper Link Sensing, Eldred L. Cullins, Ser. No. 293,131 which shows a similar electrical circuit which might be used. The signal generated by the strain gauges 48 and 49 is transmitted to the amplifier 50 which in turn operates the solenoid 51 of a solenoid valve 52. The solenoid valve 52 is a four-way valve to operate the rams on the rock shaft of which ram 11 is shown. The valve 52 has three positions. In the first or neutral position the passages in the valve are closed. In the second position the pump 53 is connected through the valve to the rod end 54 of the cylinder 11 while the return side of the cylinder 11 is connected to the sump passage 55 which returns to the reservoir 86. A third position is where the pump 53 is connected to the base side 56 of the cylinder 11 while the rod end chamber of the cylinder 11 is connected to the sump passage 55.

Referring to FIG. 6 a strain gauge sensing unit is shown adapted to a torsion bar draft load sensing mechanism. The sleeve 60 is supported by supports 61, 62 to permit rotation of the sleeve within the support. The torsion bar 63 is splined at the end 64 to the support 61. The end 65 is splined to the sleeve 60 so that when the sleeve is rotated the torsion bar 63 is stressed torsionally.

The arm 66 carries a pin 67 which in turn supports the spherical bushing 68 carrying the draft arm 69. The arm 66 is nonrotatably fastened to the external portion of the right-hand end of the sleeve 60.

The arm 70 is nonrotatably fastened to the external portion of the left-hand end of the sleeve 60. The arm 70 is connected to the pin 71 which supports the spherical bushing 72 which in turn supports the draft arm 73. The draft arms 69 and 73 rotate sleeve 60 when a draft load is applied to the draft arms. This in turn applies a torsional stress on the torsion bar 63. A pair of strain gauges 74 and 75 are positioned on the back and front sides of the torsion bar. Suitable conductors are connected to the strain gauges to transmit the signal generated by the strain gauges when a torsional stress is produced on the torsion bar 63 in response to a draft load applied to the draft arms 69 and 73.

The operation of this device will be described in the following paragraphs.

The lower draft arms 14 and 15 are connected to the implement 9 while the upper link 8 is connected between the tractor and the mast 80 of the implement. As the tractor 1 draws the implement 9 the draft load of the implement is carried on the crossbars 29 and 35. The crossbars 29 and 35 deflect in a bending movement in response to the load carried on the crossbars. The strain gauges 48, 49 are strained in response to the deflection of the bars 29 and 35. The strain gauges initiate a signal which is transmitted to the amplifier 50 where the signal is amplified. The amplifier 50 sufficiently amplifies the signal and operates a solenoid valve circuit so that it can operate the solenoid valve 52. A solenoid coil 81 is connected to the solenoid valve circuit in the amplifier and a current is directed in either direction through the coil depending on the draft load on the draft arm.

The solenoid valve 52 is a three position valve. The valve is normally spring biased to a neutral position in which communication is blocked between the pump 53 and the rams for operating the rock shaft to lift or lower the draft arms 14 and 15. When a sufficiently high draft load is applied to the draft arms, the signal from the strain gauge applied to the amplifier operates the solenoid valve to move in the left-hand direction and current flows through the solenoid coil 81 causing fluid to flow from the pump through the conduit 85 into the hydraulic cylinders 11. Return flow from the conduit 84 flows through the solenoid valve and returns to the reservoir 86. This action of the hydraulic cylinders 11 biases the rock shaft in the counterclockwise direction thereby lifting the draft arms 14 and 15. Upon raising of the implement the draft load is reduced and the system again reaches the state of equilibrium. The solenoid valve 52 is then returned to its normally neutral position by mutually opposing springs of the valve spool.

With a reversal of the strain gauge signal caused by a sufficiently light draft load, the amplifier applies current to the solenoid valve 81 through the solenoid coil thereby biasing solenoid coil in the opposite direction. This in turn causes the spool to move from a right-hand direction and the pressurized fluid from the pump 53 passes through conduit 84 into the hydraulic cylinders 11 contacting hydraulic cylinders. The fluid on the base end of the cylinder flows out of the cylinder 11 through conduit 85 and into the sump passage 55 and reservoir 86. Accordingly, the draft arms 14 and 15 are lowered and the implement itself is lowered to increase the draft load. The weight of the rear wheels is reduced and the weight on the front wheel is increased and again the system reaches a point at equilibrium when the draft load is increased on the draft arms.

The relative diameter of the sensing bars 29 and 35 to the inside diameter of sleeve 28 is determined so that protective stop means is provided in all radial directions caused by excessive loads transmitted through the draft arms 15, whether they are caused by extreme tensile loads in the field, or, extreme compressive loads due to jounce in transport of the mounted or semi-mounted implement. The predetermined proximity of the abutment surface limits the deformation of bars 29 and 25, thus limiting strain and preventing damage to the strain gauges. Although the clearance is provided by removal of material from crossbars 29 and 30 it could have been removed from the sleeve to provide a like clearance.

Accordingly, it can be seen that for the strain gauge sensing system as shown in FIGS. 3, 4 and 5, the crossbars 29 and 35 are operating in bending to initiate the strain gauge signal. It is understood that a single crossbar will work as well as the two bar arrangement as shown.

The modification as shown in FIG. 6 shows a torsion bar sensing unit in which the strain gauges 74 and 75 are positioned at an angle of approximately 45° to the longitudinal axis to the torsional bar 63. As the draft load is applied to the draft arms 69 and 73, the torsion tube 60 applies a torsion stress to the torsion bar 63. The torsion stress in the torsion bar 63 strains the strain gauge 74 in tension and strain gauge 75 in compression as viewed in FIG. 6. The strain gauges are connected to the amplifier 50 as described in FIG. 2. As the strain gage signal increases or decreases responsive to draft load, the signal is applied to the amplifier, and the amplifier in turn operates the hydraulic system through the solenoid valve. Accordingly, the implement is raised and lowered in response to the draft load applied to the lower draft arms. Either system provides a stress in the bar, and this stress in turn causes a strain on the strain gauges to gemerate a signal which is amplified which in turn operates hydraulic weight distribution system on the tractor. The sensing system is electronically operated and controls the hydraulic system.

The embodiments of the invention in which an exclusive property or privilege is claimed are defined as follows:

1. A draft load sensing system on a vehicle comprising, a vehicle, at least one draft arm, at least one crossbar including means rigidly mounting said crossbar on said vehicle for bending said crossbar responsive to draft loads on said draft arm, means on said crossbar supporting one end of said draft arm for universal movement, a hydraulic system including a hydraulic motor means mounted on said vehicle and connecting means connected between said motor means and said draft arm for raising and lowering said draft arm, a hydraulic valve in said hydraulic system for controlling the operation of said hydraulic motor means, a strain gauge means mounted on said crossbar between the mounting on said vehicle and the connection to said draft arm for generating a signal responsive to bending strain in said bar, an electronic amplifier circuit connected to said strain gauge for amplifying the signal, an electrical control means on said hydraulic valve connected to said amplifier for opening and closing said valve to said motor means and raising and lowering said draft arm responsive to an increase and decrease of the draft load on said draft arm bending said crossbar.

2. A draft load sensing system on a vehicle as set forth in claim 1 including said means supporting said crossbar being transverse relative to said vehicle for bending on its axis.

3. A draft load sensing system on a vehicle as set forth in claim 1 including two lower draft arms, means supporting one end of each of said lower draft arms for universal movement to said crossbar to thereby generate a signal in response to the draft load applied to said draft arms.

4. A draft load sensing system on a vehicle as set forth in claim 1 including a protective sleeve enclosing said crossbar, means defining a clearance between said crossbar and said sleeve on the outboard portions of said crossbar, two lower draft arms, means connecting a draft arm on each of the outboard ends of said crossbar to thereby provide means for bending said bar in response to draft loads on said draft arms.

5. A draft load sensing system on a vehicle as set forth in claim 1 including two strain gauges positioned on said crossbar including means positioning one of said strain gauges on one side of said crossbar, means positioning the second gauge on the opposite side of said crossbar to thereby generate a signal in response to draft loads on said draft arms.

6. A draft load sensing system on a vehicle as set forth in claim 1 including a three-point hitch having an upper draft link and two lower draft arms including said one draft arm, said connecting means for raising and lowering said draft arm including a rock shaft positioned on said vehicle, a pair of rock arms connected through lift links to raise and lower said draft arms in response to the draft load applied to said lower draft arms.

7. A draft load sensing system on a vehicle as set forth in claim 1 including a sleeve enclosing said crossbar, means defining a clearance between said sleeve of said crossbar where said crossbar is connected to said draft arm whereby the clearance between the outboard end of said crossbar and the internal periphery of said sleeve provide an overload limit for bending of said crossbar.

8. A draft load sensing system on a vehicle as set forth in claim 1 including a three point hitch having two lower draft arms, a sleeve connected to said vehicle, a pair of crossbars received within the said sleeve, means for fastening the inner ends of said crossbars to said sleeve, one of said lower draft arms connected to an outer end of each of said crossbar, a strain gauge positioned on one side of said crossbar and the opposing side of the other crossbar to thereby generate a signal in response to draft loads applied to said lower draft arms.

* * * * *